(12) United States Patent
Tsai et al.

(10) Patent No.: US 9,470,887 B2
(45) Date of Patent: Oct. 18, 2016

(54) COLOR WHEEL AND PROJECTION DEVICE

(71) Applicant: Coretronic Corporation, Hsin-Chu (TW)

(72) Inventors: Te-Ying Tsai, Hsin-Chu (TW);
Tsung-Ching Lin, Hsin-Chu (TW);
Pei-Rong Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 14/740,270

(22) Filed: Jun. 16, 2015

(65) Prior Publication Data
US 2016/0077325 A1 Mar. 17, 2016

(30) Foreign Application Priority Data

Sep. 11, 2014 (TW) .............................. 103131328 A (51) Int. Cl.
*G02B 26/00* (2006.01)
*G03B 21/20* (2006.01)
*H04N 9/31* (2006.01)

(52) U.S. Cl.
CPC ........... *G02B 26/008* (2013.01); *G03B 21/204* (2013.01); *H04N 9/3111* (2013.01)

(58) Field of Classification Search
CPC .............. H04N 9/3114; H04N 9/3117; G02B 26/008; G02B 26/007; G03B 21/204
USPC ........ 359/885, 889, 891, 892; 348/742, 743; 353/84
See application file for complete search history.

(56) References Cited

U.S. PATENT DOCUMENTS

| 6,618,213 B2 | 9/2003 | Inamoto |
| 7,018,051 B2 | 3/2006 | Bok |
| 2003/0156262 A1 | 8/2003 | Baker et al. |
| 2004/0145707 A1 | 7/2004 | Lee |
| 2006/0066817 A1 | 3/2006 | Chin et al. |
| 2007/0030583 A1* | 2/2007 | Lin ...................... G02B 26/008 359/892 |
| 2009/0034105 A1 | 2/2009 | Ho |
| 2010/0245777 A1 | 9/2010 | Ogura |
| 2013/0169938 A1 | 7/2013 | Huang et al. |

FOREIGN PATENT DOCUMENTS

| CN | 1797181 | 7/2006 |
| CN | 101359076 | 2/2009 |

(Continued)

OTHER PUBLICATIONS

"Office Action of Taiwan Counterpart Application", issued on Sep. 23, 2015, p. 1-p. 9.

*Primary Examiner* — William C Dowling
(74) *Attorney, Agent, or Firm* — Jianq Chyun IP Office (57) ABSTRACT

A color wheel is suitable for being disposed at a transmission path of an illumination beam emitted from a light source of a projection device. The color wheel includes a disc. The disc is suitable for rotating with respect to an axis. The disc has a non-light converting region and a light converting region. The disc has a first reference surface and a second reference surface opposite to the first reference surface. The disc has a plurality of first disturbing portions and a plurality of second disturbing portions. The first disturbing portions are located at the first reference surface and in the non-light converting region. The second disturbing portions are located at the second reference surface and in the non-light converting region. The first disturbing portions and the second disturbing portions are structurally continuous relative to the disc.

21 Claims, 4 Drawing Sheets

(56) References Cited

FOREIGN PATENT DOCUMENTS

| CN | 102141715 | 8/2011 |
| CN | 102853377 | 1/2013 |
| CN | 103226283 | 7/2013 |
| CN | 203489181 | 3/2014 |
| CN | 103900035 | 7/2014 |
| JP | 2011-128521 | 6/2011 |
| TW | 520041 | 2/2003 |
| TW | I297418 | 6/2008 |

* cited by examiner

COLOR WHEEL AND PROJECTION DEVICE

CROSS-REFERENCE TO RELATED APPLICATION

This application claims the priority benefit of Taiwan application serial no. 103131328, filed on Sep. 11, 2014. The entirety of the above-mentioned patent application is hereby incorporated by reference herein and made a part of this specification.

BACKGROUND

1. Technical Field

The invention relates to a color wheel adapted to a projection device and a projection device using the color wheel.

2. Related Art

Projector is a display device used for producing large size images. A projector is to convert an illumination beam produced by a light source module into an image beam by using a light valve, and project the image beam onto a screen or a wall through a projection lens to form an image.

In order to produce illumination beams of three primary colors (red, blue, green), the projector is configured with a color wheel. According to the difference in the light sources, the color wheel has a light converting region (for example, filter regions or phosphor regions). When the light converting region includes a plurality of filter regions, the filter regions can convert, for example, a white illumination beam passing there through into a required color beam. When the light converting region is a plurality of phosphor regions, the phosphor regions can convert, for example, an irradiated blue laser beam produced by the light source into the required color beam.

For example, when the light source produces a blue laser beam, in addition to directly providing a blue light, the blue laser beam can also excite a yellow phosphor powder and a green phosphor powder to generate a red light and a green light.

Since the color wheel is continually irradiated by the light source, a material of the color wheel generally adopts a thermal conductive material such as stainless steel, aluminium, copper, etc., so as to decrease an operation temperature of the color wheel, and avoid excessively high temperature of the filter regions and/or the phosphor regions.

Patents related to a color wheel include U.S. Patent Publication No. 20130169938 and 20060066817 and China Patent Publication No. CN101359076.

The information disclosed in this "BACKGROUND" section is only for enhancement understanding of the background of the invention and therefore it may contain information that does not form the prior art that is already known to a person of ordinary skill in the art. Furthermore, the information disclosed in this "BACKGROUND" section does not mean that one or more problems to be solved by one or more embodiments of the invention was acknowledged by a person of ordinary skill in the art.

SUMMARY

The invention is directed to a color wheel, which has good heat dissipation capability without increasing extra noise.

The invention is directed to a projection device, which has the aforementioned color wheel, such that the projection device has good heat dissipation capability without increasing extra noise.

Other objects and advantages of the invention can be further illustrated by the technical features broadly embodied and described as follows.

In order to achieve one or a portion of or all of the objects or other objects, an embodiment of the invention provides a color wheel, which is adapted to be disposed at a transmission path of an illumination beam emitted from a light source of a projection device. The color wheel includes a disc. The disc is suitable for rotating with respect to an axis. The disc has a non-light converting region and a light converting region. The disc has a first reference surface and a second reference surface opposite to the first reference surface. The disc has a plurality of first disturbing portions and a plurality of second disturbing portions. The first disturbing portions are located at the first reference surface and located in the non-light converting region. The second disturbing portions are located at the second reference surface and located in the non-light converting region. The first disturbing portions and the second disturbing portions are structurally continuous relative to the disc.

In an embodiment of the invention, the disc has a plurality of concave-convex structures, and the concave-convex structures are located in the non-light converting region, and each of the concave-convex structures forms one of the first disturbing portions and the corresponding second disturbing portion.

In an embodiment of the invention, a height of each of the concave-convex structures protruding out of the first reference surface or the second reference surface is smaller than 1.5 times of a thickness of the disc.

In an embodiment of the invention, a part of the concave-convex structures protrude out of the first reference surface, and the other concave-convex structures are recessed in the first reference surface, and the concave-convex structures protruding out of the first reference surface and the concave-convex structures recessed in the first reference surface are alternately arranged around the axis.

In an embodiment of the invention, the concave-convex structures have a linear radial distribution, an arc radial distribution or irregular radial distribution relative to the axis.

In an embodiment of the invention, each of the first disturbing portions protrudes out of the first reference surface or is recessed in the first reference surface.

In an embodiment of the invention, a height of each of the first disturbing portions protruding out of the first reference surface is smaller than 1.5 times of a thickness of the disc, or a depth of each of the first disturbing portions recessed in the first reference surface is smaller than 1.5 times of a thickness of the disc.

In an embodiment of the invention, each of the second disturbing portions protrudes out of the second reference surface or is recessed in the second reference surface.

In an embodiment of the invention, a height of each of the second disturbing portions protruding out of the second reference surface is smaller than 1.5 times of a thickness of the disc, or a depth of each of the second disturbing portions recessed in the second reference surface is smaller than 1.5 times of a thickness of the disc.

Another embodiment of the invention provides a projection device including a light source, a light valve, a projection lens and a color wheel. The light source is adapted to emit an illumination beam. The light valve is disposed at a transmission path of the illumination beam to convert the illumination beam into an image beam. The projection lens is disposed at a transmission path of the image beam for projecting the image beam. The color wheel is disposed at the transmission path of the illumination beam and disposed between the light source and the light valve. The color wheel includes a disc. The disc is suitable for rotating with respect to an axis. The disc has a non-light converting region and a light converting region. The disc has a first reference surface and a second reference surface opposite to the first reference surface. The disc has a plurality of first disturbing portions and a plurality of second disturbing portions. The first disturbing portions are located at the first reference surface and located in the non-light converting region. The second disturbing portions are located at the second reference surface and located in the non-light converting region. The first disturbing portions and the second disturbing portions are structurally continuous relative to the disc.

In an embodiment of the invention, the light source contains at least one laser diode, the color wheel is a phosphor wheel, the light converting region has a phosphor region, and the phosphor region has a phosphor powder layer.

According to the above descriptions, in the aforementioned embodiments of the invention, the disturbing portions protruding out of the reference surface of the disc are formed in the non-light converting region of the disc, by which not only a heat dissipation area is increased, but also an air disturbing effect is increased without increasing noise.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
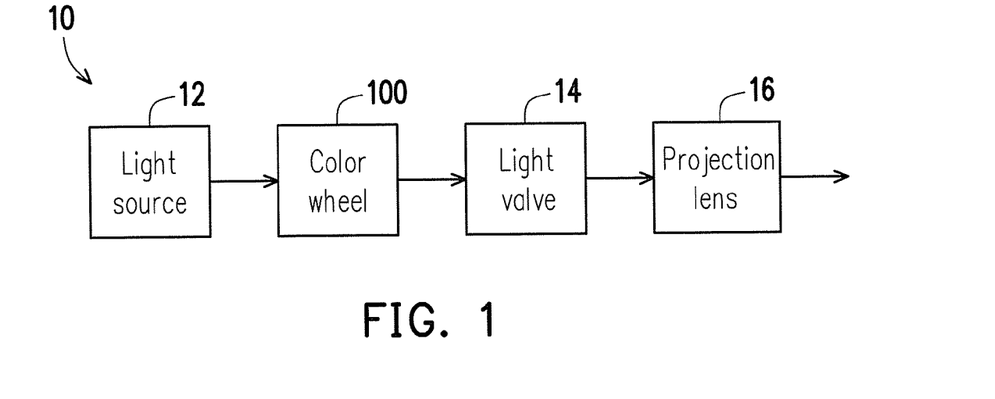
FIG. 1 is a block diagram of a projection device according to an embodiment of the invention.

Referring to FIG. 1, in the present embodiment, the projection device 10 includes a light source 12, a color wheel 100, a light valve 14 and a projection lens 16. The light source 12 is adapted to emit an illumination beam. The light valve 14 is disposed at a transmission path of the illumination beam to convert the illumination beam into an image beam. The projection lens 16 is disposed at a transmission path of the image beam for projecting the image beam. The color wheel 100 is disposed at the transmission path of the illumination beam for sequentially converting the illumination beam emitted by the light source 12 into illumination beams of a plurality of different colors (for example, red (R), green (G), blue (B)). The light valve 14 can sequentially convert the illumination beams of different colors into image beams of different colors, and the projection lens 16 projects the image beams of different colors, so as to generate an image of different colors on a screen. In this way, based on a visual persistence effect of human eyes, an observer can perceive a color image. In one embodiment, the light source 12 comprises at least one laser diode, and the illumination beam is a blue laser beam, but the invention is not limited thereto.

Figure 2A:
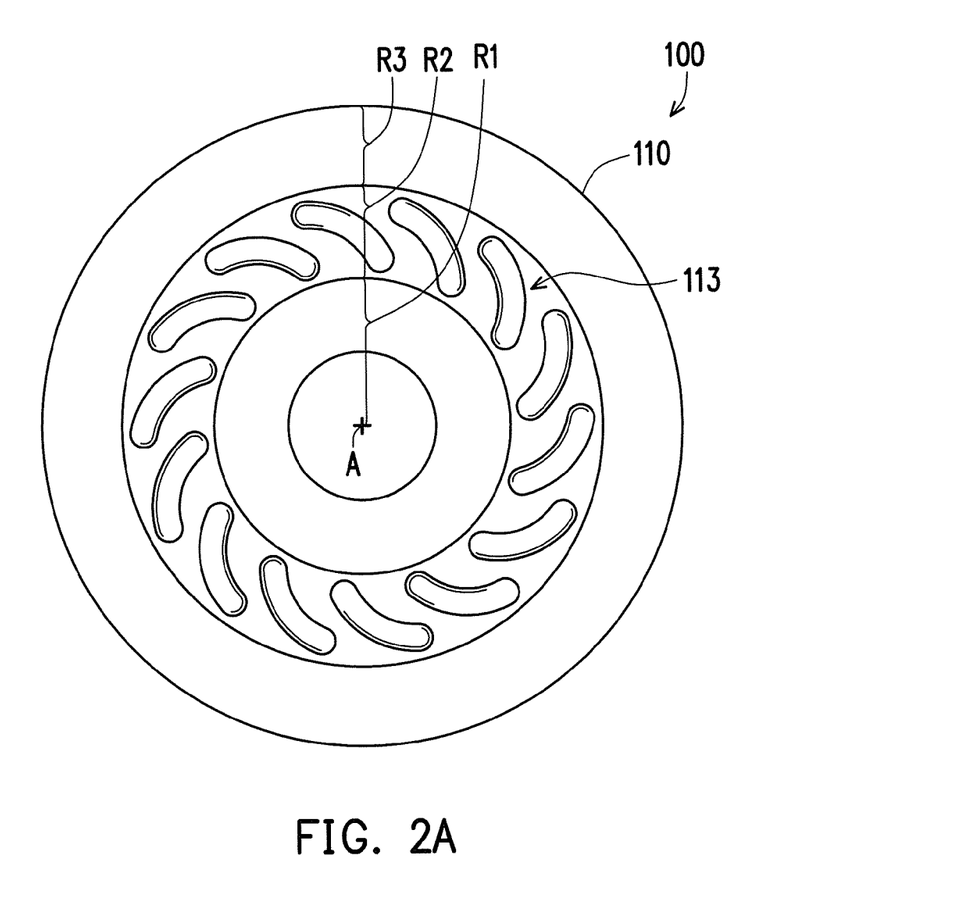
FIG. 2A is a front view of a color wheel of FIG. 1.
Figure 2B:
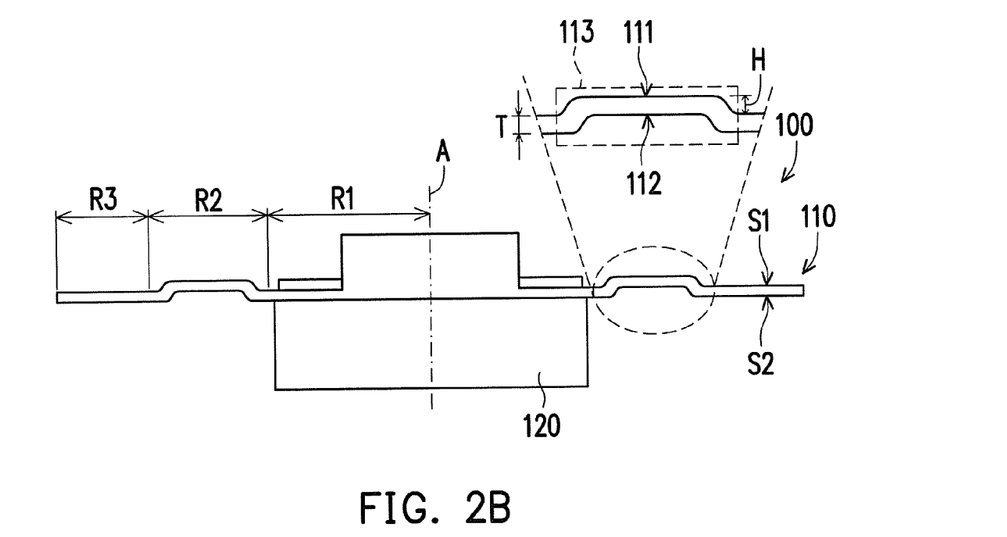
FIG. 2B is a cross-sectional view of the color wheel of FIG. 1.

Referring to FIG. 2A and FIG. 2B, in the present embodiment, the color wheel 100 includes a disc 110, which is assembled to a motor 120 for rotating with respect to an axis A. In order to achieve a heat dissipation effect, a material of the disc can be metal with good heat conductivity, such as stainless steel, aluminium, or copper, but the invention is not limited thereto. In the present embodiment, the disc 110 has a fixing region R1, a non-light converting region R2 and a light converting region R3. The fixing region R1 is assembled to the motor 120 and is suitable for being driven by the motor 120 to rotate with respect to the axis A. In the present embodiment, the light converting region R3 of the color wheel 100 may include a filter region or a phosphor region for converting the illumination beam into a color illumination beam (i.e. to change a wavelength of the illumination beam). In another embodiment, the light converting region R3 may comprise an opening region or transparent region without color for letting the illumination beam (for example, a blue illumination beam) to direct pass there through. The color wheel can be a phosphor wheel having a phosphor powder layer for converting color light or a color wheel having a filter. In other words, if the light converting region R3 comprises a phosphor region, the phosphor region comprises a phosphor powder layer; if the light converting region R3 comprises a filter region, the filter region comprises one or more color filters.

The disc 110 has a first reference surface S1 and a second reference surface S2 opposite to the first reference surface S1. The disc 110 has a plurality of first disturbing portions 111 and a plurality of second disturbing portions 112. The first disturbing portions 111 and second disturbing portions 112 may increase heat dissipation areas and may also used to increase air disturbing effect. The first disturbing portions 111 are located at the first reference surface S1 and located in the non-light converting region R2. The second disturbing portions 112 are located at the second reference surface S2 and located in the non-light converting region R2. The first disturbing portions 111 and the second disturbing portions 112 are structurally continuous relative to the disc 110, i.e. the first disturbing portions 111 and the second disturbing portions 112 are not formed by cutting any portion of the disc 110 at the non-light converting region R2.

In the present embodiment, the disc 110 has a plurality of concave-convex structures 113, and the concave-convex structures 113 are located in the non-light converting region R2. Each of the concave-convex structures 113 forms one of the first disturbing portions 111 and the corresponding second disturbing portion 112. A height H of each of the concave-convex structures 113 protruding out of the first reference surface S1 or the second reference surface S2 is smaller than 1.5 times of a thickness T of the disc 110. As shown in FIG. 2B, in one embodiment, the first disturbing portions 111 are convex structures and protrude out of the first reference surface S1 with a height H, and the second disturbing portions 112 are concave structures and are recessed in the second reference surface S2 with a depth H (i.e. the top of the concave portion has a height H with respect to the second reference surface S2).

In another embodiment, the height H of each of the concave-convex structures 113 protruding out of the first reference surface S1 or the second reference surface S2 is smaller than 5 mm, though the invention is not limited thereto.

Figure 3:
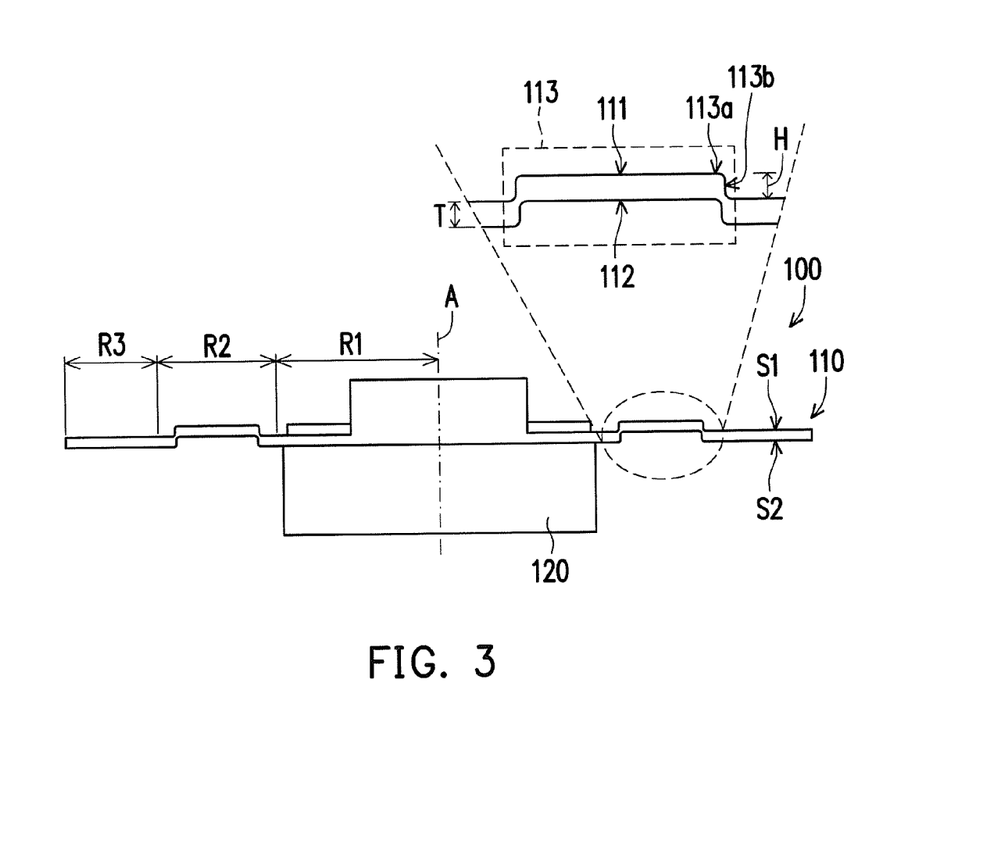
FIG. 3 is a cross-sectional view of a color wheel according to another embodiment of the invention.

In the present embodiment, as shown in FIG. 2B, the concave-convex structures 113 can be formed on the disc 110 through stamping. Each of the concave-convex structures 113 may have a smooth protruding contour (shown in FIG. 2B) or a sharper protruding contour (shown in FIG. 3) depending on the stamping dies. As shown in FIG. 3, the concave-convex structure 113 has a sharper protruding contour, which can increase an air disturbing effect. In detail, the concave-convex structure 113 has a top surface 113a and a side surface 113b, where the top surface 113a is substantially parallel to the first reference surface S1 or the second reference surface S2, and the side surface 113b is substantially perpendicular to the top surface 113a. Therefore, the sharper protruding contour is formed between the top surface 113a and the side surface 113b. In the present embodiment, an included angle between the top surface 113a and the side surface 113b is about 90 degrees (though the invention is not limited thereto), which can increase the air disturbing effect.

Figure 4:
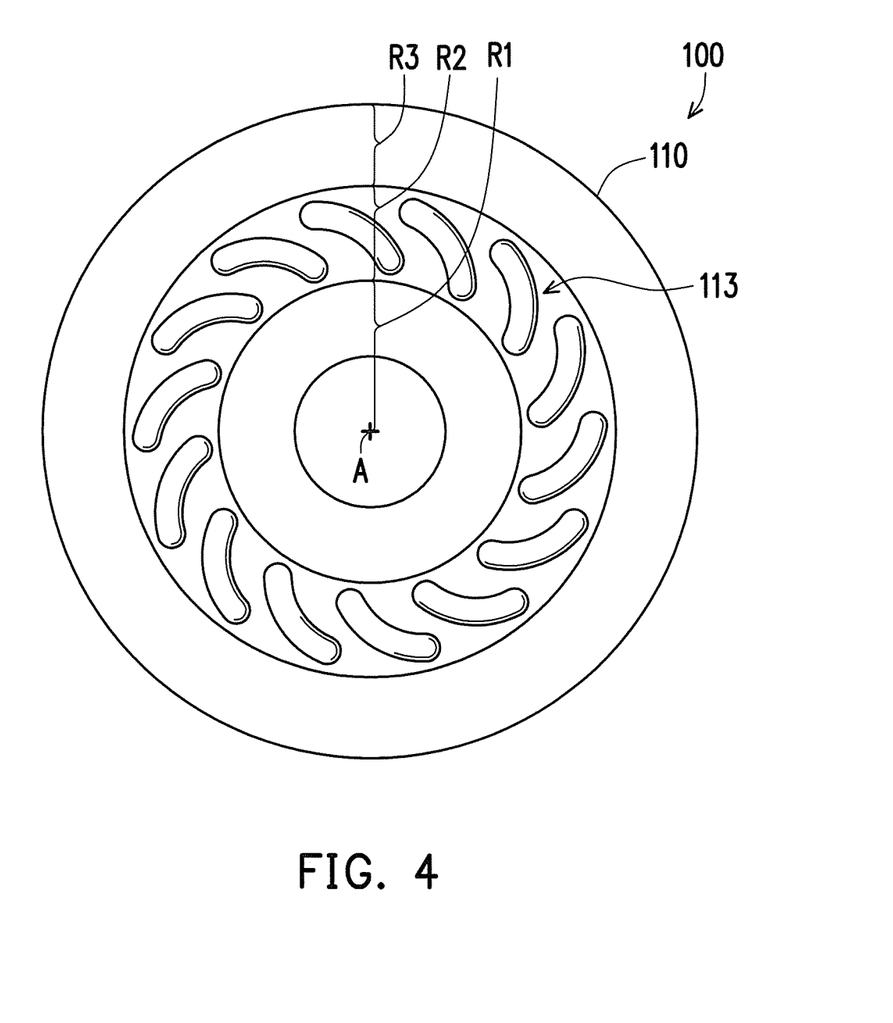
FIG. 4 is a front view of a color wheel according to another embodiment of the invention.

In the present embodiment, a part of the concave-convex structures 113 protrude out of the first reference surface S1, and the other concave-convex structures protrude out of the second reference surface S2, and the concave-convex structures 113 protruding out of the first reference surface S1 and the concave-convex structures 113 protruding out of the second reference surface S2 are alternately arranged around the axis A. In another embodiment, as shown in FIG. 4, all of the concave-convex structures 113 can protrude out of the first reference surface S1 or the second reference surface S2, and are arranged around the axis A. For example, the concave-convex structures 113 are convex structures on the first reference surface S1 and concave structures on the second reference surface S2, or are concave structures on the first reference surface S1 and convex structures on the second reference surface S2, or the concave-convex structures 113 are a part of convex structures and a part of convex structures on the first reference surface S1 and are alternately arranged around the axis A. In another embodiment, the concave-convex structures 113 are concave structures on both of the first reference surface S1 and the second reference surface S2, or are convex structures on both of the first reference surface S1 and the second reference surface S2, though the invention is not limited thereto.

Figure 5:
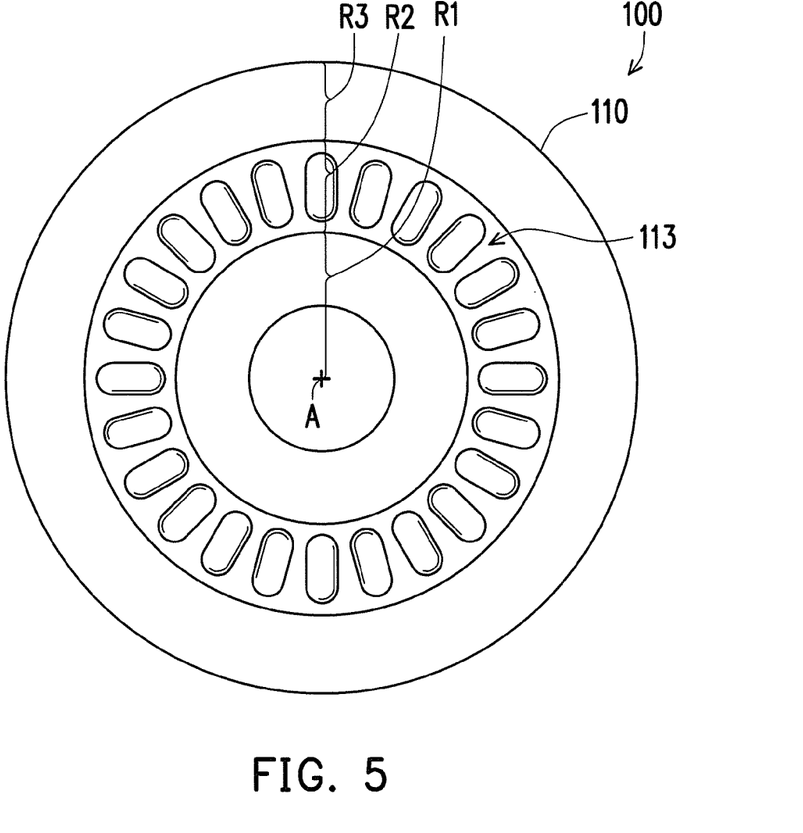
FIG. 5 is a front view of a color wheel according to another embodiment of the invention.

In the present embodiment, as shown in FIG. 2A, the arrangement of the concave-convex structures 113 may have an arc radial distribution relative to the axis A. However, in another embodiment, as shown in FIG. 5, the arrangement of the concave-convex structures 113 may have a linear radial distribution relative to the axis A. In other embodiments that are not illustrated, the arrangement of the concave-convex structures 113 may have other distributions, for example, an irregular radial distribution.

For example, under conditions of an open space, an environment temperature with 60 degrees Celsius, 10000 lumen (lm) illumination and the light converting region R3 using phosphor powder, the disc 110 without the concave-convex structures 113, the disc 110 with the arrangement of linear radial concave-convex structures 113 shown in FIG. 5, and the disc 110 with the arrangement of the arc radial concave-convex structures 113 shown in FIG. 2A are taken as experimental objects. A measured operation temperature of the disc 110 without the concave-convex structures 113 is about 135 degrees Celsius. A measured operation temperature of the disc 110 with the arrangement of linear radial concave-convex structures 113 shown in FIG. 5 is about 112 degrees Celsius, which has a temperature reduction of 17% compared with the disc without the concave-convex structures. A measured operation temperature of the disc 110 with the arrangement of arc radial concave-convex structures 113 shown in FIG. 2A is about 120 degrees Celsius, which has a temperature reduction of 11% compared with the disc without the concave-convex structures. Therefore, it can reduce the operation temperature of the disc 110 by adding the concave-convex structures 113 to the disc 110.

Under conditions of an open space, an environment temperature with 60 degrees Celsius, 10000 lumen (lm) illumination and the light converting region R3 using phosphor powder, the disc 110 with the arrangement of linear radial concave-convex structures 113 shown in FIG. 5 is taken as an experimental object. In case that no fan is used for blowing the disc 110, the measured operation temperature of the disc 110 with the arrangement of linear radial concave-convex structures 113 shown in FIG. 5 is about 112 degrees Celsius, and in case that a fan is used for blowing the disc 110, the measured operation temperature of the disc 110 with the arrangement of linear radial concave-convex structures 113 shown in FIG. 5 is about 96 degrees Celsius, which has a temperature reduction of 14% compared with the disc without using the fan to blow it. Therefore, by using the fan for cooling the disc 110, it can further reduce more operation temperature.

Moreover, under conditions of in system, an environment temperature of 60 degrees Celsius, 10000 lumen (lm) illumination and the light converting region R3 of phosphor powder, the disc 110 without the concave-convex structures 113, the disc 110 with the linear radial concave-convex structures 113 shown in FIG. 5, and the disc 110 with the arc radial concave-convex structures 113 shown in FIG. 2A are taken as experimental objects, and it is learned that a measured noise of the disc 110 without the concave-convex structures 113 is about 37.3 dB (A). A measured noise of the disc 110 with the linear radial concave-convex structures 113 shown in FIG. 5 is about 37.3 dB (A), which has no noise increase. A measured noise of the disc 110 with the arc radial concave-convex structures 113 shown in FIG. 2A is about 37.1 dB (A), which has no noise increase.

Figure 6:
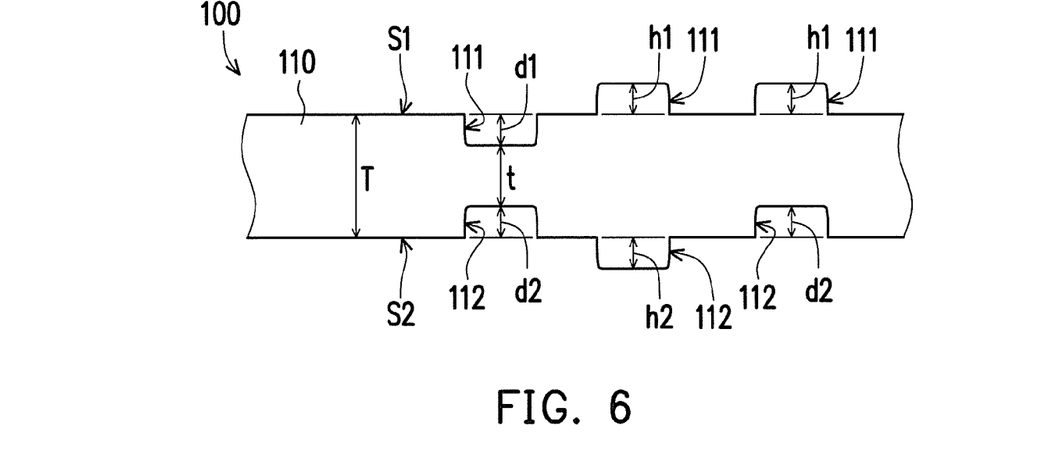
FIG. 6 is a cross-sectional view of a color wheel according to another embodiment of the invention.

Referring to FIG. 6, in the present embodiment, different to the stamping method, the first disturbing portions 111 and the second disturbing portions 112 can be respectively formed on the first reference surface S1 and the second reference surface S2 of the disc 110 through casting, forging or CNC milling, etc. Therefore, each of the first disturbing portions 111 can protrude out of the first reference surface S1 or can be recessed in the first reference surface S1. Each of the second disturbing portions 112 can protrude out of the second reference surface S2 or can be recessed in the second reference surface S2. A height h1 of each of the first disturbing portions 111 protruding out of the first reference surface S1 is smaller than 1.5 times of the thickness T of the disc 110, or a depth d1 of each of the first disturbing portions 111 recessed in the first reference surface S1 is smaller than 1.5 times of the thickness T of the disc 110. A height h2 of each of the second disturbing portions 112 protruding out of the second reference surface S2 is smaller than 1.5 times of the thickness T of the disc 110, or a depth d2 of each of the second disturbing portions 112 recessed in the second reference surface S2 is smaller than 1.5 times of the thickness T of the disc 110. Moreover, a distance between the first disturbing portion 111 recessed in the first reference surface S1 and the second disturbing portion 112 recessed in the second reference surface S2 is t, and t is greater than 0 and smaller than T. In one or more embodiments, the height h1 of each of the first disturbing portions 111 protruding out of the first reference surface S1 is 0.3 times of the thickness T of the disc 110 (i.e. h1=0.3 T); the depth d1 of each of the first disturbing portions 111 recessed in the first reference surface S1 is 0.3 times of the thickness T of the disc 110 (i.e. d1=0.3 T); the height h2 of each of the second disturbing portions 112 protruding out of the second reference surface S2 is 0.3 times of the thickness T of the disc 110 (i.e. h2=0.3 T); the depth d2 of each of the second disturbing portions 112 recessed in the second reference surface S2 is 0.3 times of the thickness T of the disc 110 (i.e. d2=0.3 T); the distance t between the first disturbing portion 111 recessed in the first reference surface S1 and the second disturbing portion 112 recessed in the second reference surface S2 is 0.3 times of the thickness T of the disc 110 (i.e. t=0.3 T).

In summary, in the embodiments of the invention, with the disturbing portions protruding out of the reference surface or recessed in the reference surface of the disc are formed in the non-light converting region of the disc, a heat dissipation area is increased, and an air disturbing effect may be increased without increasing noise.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all team are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A color wheel, adapted to be disposed at a transmission path of an illumination beam emitted from a light source of a projection device, the color wheel comprising:
a disc suitable for rotating with respect to an axis, wherein the disc has a non-light converting region and a light converting region, the disc has a first reference surface and a second reference surface opposite to the first reference surface, the disc has a plurality of first disturbing portions and a plurality of second disturbing portions, the first disturbing portions are located at the first reference surface and located in the non-light converting region, the second disturbing portions are located at the second reference surface and located in the non-light converting region, and the first disturbing portions and the second disturbing portions are structurally continuous relative to the disc.

2. The color wheel as claimed in claim 1, wherein the disc has a plurality of concave-convex structures, and the concave-convex structures are located in the non-light converting region, and each of the concave-convex structures forms one of the first disturbing portions and the corresponding second disturbing portion.

3. The color wheel as claimed in claim 2, wherein a height of each of the concave-convex structures protruding out of the first reference surface or the second reference surface is smaller than 1.5 times of a thickness of the disc.

4. The color wheel as claimed in claim 2, wherein a part of the concave-convex structures protrude out of the first reference surface, and the other concave-convex structures are recessed in the first reference surface, and the concave-convex structures protruding out of the first reference surface and the concave-convex structures recessed in the first reference surface are alternately arranged around the axis.

5. The color wheel as claimed in claim 2, wherein each of the concave-convex structures has a top surface and a side surface, the top surface is substantially parallel to the first reference surface or the second reference surface, and the side surface is substantially perpendicular to the top surface.

6. The color wheel as claimed in claim 2, wherein the concave-convex structures have a linear radial distribution, an arc radial distribution or irregular radial distribution relative to the axis.

7. The color wheel as claimed in claim 1, wherein each of the first disturbing portions protrudes out of the first reference surface or is recessed in the first reference surface.

8. The color wheel as claimed in claim 7, wherein a height of each of the first disturbing portions protruding out of the first reference surface is smaller than 1.5 times of a thickness of the disc, or a depth of each of the first disturbing portions recessed in the first reference surface is smaller than 1.5 times of a thickness of the disc.

9. The color wheel as claimed in claim 1, wherein each of the second disturbing portions protrudes out of the second reference surface or is recessed in the second reference surface.

10. The color wheel as claimed in claim 9, wherein a height of each of the second disturbing portions protruding out of the second reference surface is smaller than 1.5 times of a thickness of the disc, or a depth of each of the second disturbing portions recessed in the second reference surface is smaller than 1.5 times of a thickness of the disc.

11. A projection device, comprising:
a light source adapted to emit an illumination beam;
a light valve disposed at a transmission path of the illumination beam, and converting the illumination beam into an image beam;
a projection lens disposed at a transmission path of the image beam, and projecting the image beam; and
a color wheel disposed at the transmission path of the illumination beam and disposed between the light source and the light valve, and comprising:
a disc, suitable for rotating with respect to an axis, wherein the disc has a non-light converting region and a light converting region, the disc has a first reference surface and a second reference surface opposite to the first reference surface, the disc has a plurality of first disturbing portions and a plurality of second disturbing portions, the first disturbing portions are located at the first reference surface and located in the non-light converting region, the second disturbing portions are located at the second reference surface and located in the non-light converting region, and the first disturbing portions and the second disturbing portions are structurally continuous relative to the disc.

12. The projection device as claimed in claim 11, wherein the disc has a plurality of concave-convex structures, and the concave-convex structures are located in the non-light converting region, and each of the concave-convex structures forms one of the first disturbing portions and the corresponding second disturbing portion.

13. The projection device as claimed in claim 12, wherein a height of each of the concave-convex structures protruding out of the first reference surface or the second reference surface is smaller than 1.5 times of a thickness of the disc.

14. The projection device as claimed in claim 12, wherein a part of the concave-convex structures protrude out of the first reference surface, and the other concave-convex structures are recessed in the first reference surface, and the concave-convex structures protruding out of the first reference surface and the concave-convex structures recessed in the first reference surface are alternately arranged around the axis.

15. The projection device as claimed in claim 12, wherein each of the concave-convex structures has a top surface and a side surface, the top surface is substantially parallel to the first reference surface or the second reference surface, and the side surface is substantially perpendicular to the top surface.

16. The projection device as claimed in claim 12, wherein the concave-convex structures have a linear radial distribution, an arc radial distribution or irregular radial distribution relative to the axis.

17. The projection device as claimed in claim 11, wherein each of the first disturbing portions protrudes out of the first reference surface or is recessed in the first reference surface.

18. The projection device as claimed in claim 17, wherein a height of each of the first disturbing portions protruding out of the first reference surface is smaller than 1.5 times of a thickness of the disc, or a depth of each of the first disturbing portions recessed in the first reference surface is smaller than 1.5 times of a thickness of the disc.

19. The projection device as claimed in claim 11, wherein each of the second disturbing portions protrudes out of the second reference surface or is recessed in the second reference surface.

20. The projection device as claimed in claim 19, wherein a height of each of the second disturbing portions protruding out of the second reference surface is smaller than 1.5 times of a thickness of the disc, or a depth of each of the second disturbing portions recessed in the second reference surface is smaller than 1.5 times of a thickness of the disc.

21. The projection device as claimed in claim 11, wherein the light source comprises at least one laser diode, the color wheel is a phosphor wheel, the light converting region comprises a phosphor region, and the phosphor region comprises a phosphor powder layer.

* * * * *